(12) United States Patent
Hertzschuch et al.

(10) Patent No.: US 11,392,572 B2
(45) Date of Patent: Jul. 19, 2022

(54) SELECTIVITY ESTIMATION USING NON-QUALIFYING TUPLES

(71) Applicant: SAP SE, Walldorf (DE)

(72) Inventors: Axel Hertzschuch, Dresden (DE); Norman May, Karlsruhe (DE); Lars Fricke, Graben-Neudorf (DE); Guido Moerkotte, Mannheim (DE); Florian Wolf, Heidelberg (DE); Wolfgang Lehner, Dresden (DE)

(73) Assignee: SAP SE, Walldorf (DE)

( * ) Notice: Subject to any disclaimer, the term of this patent is extended or adjusted under 35 U.S.C. 154(b) by 275 days.

(21) Appl. No.: 16/805,971

(22) Filed: Mar. 2, 2020

(65) Prior Publication Data
US 2021/0271656 A1 Sep. 2, 2021

(51) Int. Cl.
*G06F 16/22* (2019.01)
*G06F 16/245* (2019.01)
*G06F 17/18* (2006.01)

(52) U.S. Cl.
CPC ........ G06F 16/2282 (2019.01); G06F 16/245 (2019.01); G06F 17/18 (2013.01)

(58) Field of Classification Search
CPC .............. G06F 16/2282; G06F 16/245; G06F 16/24545; G06F 17/18; G06F 16/2453; G06F 16/2462
See application file for complete search history.

(56) References Cited

U.S. PATENT DOCUMENTS

| | | | | |
|---|---|---|---|---|
| 6,477,534 B1* | 11/2002 | Acharya | ............. | G06F 16/2462 |
| | | | | 707/999.005 |
| 6,865,567 B1* | 3/2005 | Oommen | .......... | G06F 16/24542 |
| 8,145,669 B2* | 3/2012 | Cormode | ............ | G06F 16/2462 |
| | | | | 707/E17.046 |
| 9,244,976 B1* | 1/2016 | Zhang | ................. | G06F 16/2453 |
| 11,269,886 B2* | 3/2022 | Meng | ....................... | G06N 3/04 |

(Continued)

OTHER PUBLICATIONS

"European Extended Search Report", European Patent Office, dated Jan. 14, 2021 (dated Jan. 14, 2021) for European Application No. 20197110.8-1213, 9pgs.

(Continued)

*Primary Examiner* — Merilyn P Nguyen
(74) *Attorney, Agent, or Firm* — Buckley, Maschoff & Talwalkar LLC

(57) ABSTRACT

A system includes determination of a query on a table, the query including a first predicate and a second predicate, determination of a sample of the table, the sample comprising a plurality of tuples of the table, determination of a first conditional probability of selecting a tuple of the sample satisfying the first predicate and the second predicate, determination of a second conditional probability of selecting a tuple of the sample satisfying the first predicate and not satisfying the second predicate, adjustment of the first conditional probability based on the second conditional probability, a number of tuples of the sample satisfying the second predicate, a number of tuples of the sample not satisfying the second predicate, and a number of tuples of the sample satisfying the first predicate and not satisfying the second predicate, and determination of a selectivity of the query on the table based on the first adjusted conditional probability.

12 Claims, 10 Drawing Sheets

(56) References Cited

U.S. PATENT DOCUMENTS

| | | | | |
|---|---|---|---|---|
| 2002/0103793 | A1* | 8/2002 | Koller | G06F 16/2462 |
| 2003/0084043 | A1* | 5/2003 | Acharya | G06F 16/24556 |
| | | | | 707/999.005 |
| 2004/0111410 | A1* | 6/2004 | Burgoon | G06F 16/2462 |
| 2004/0249810 | A1* | 12/2004 | Das | G06F 16/2462 |
| | | | | 707/999.005 |
| 2005/0228779 | A1* | 10/2005 | Chaudhuri | G06F 16/24545 |
| 2008/0086444 | A1* | 4/2008 | Yu | G06F 16/2455 |
| 2017/0228425 | A1* | 8/2017 | Kandula | G06N 7/005 |
| 2018/0157734 | A1* | 6/2018 | Drushku | G06F 16/285 |
| 2018/0341678 | A1* | 11/2018 | Moerkotte | G06F 16/24545 |
| 2020/0286011 | A1* | 9/2020 | Meng | G06F 16/242 |

OTHER PUBLICATIONS

Halford, Max et al., "An Approach Based on Bayesian Networks for Query Selectivity Estimation", Apr. 24, 2019 (Apr. 24, 2019), 12th European Conference on Computer Vision, ECCV 2012, XP047535321, ISSN: 0302-9743, ISBN: 978-3-642-04427-4, (pp. 3-19, 17 total pages).

Moerkotte, Guido et al., "α to ω: The G(r)eek Alphabet of Sampling", CIDR 2020, Jan. 12-15, 2020, ISBN 978-1-4503-2138-9, DOI: 10.1145/1235, 6pgs.

Dutt, Anshuman et al., "Selectivity Estimation for Range Predicates using Lightweight Models", Proceedings of the VLDB Endowment, vol. 12, Issue No. 9, ISSN 2150-8097, 2019, DOI: https://doi.org/10.14778/3329772.3329780, (pp. 1044-1057, 14 total pages).

Muller, Magnus et al., "Improved Selectivity Estimation by Combining Knowledge from Sampling and Synopses", Proceedings of the VLDB Endowment, vol. 11, No. 9, 2018, ISSN 2150-8097/18/05, DOI: https://doi.org/10.4778/3213880.3213882, (pp. 1016-1028, 13 total pages).

Moerkotte, Guido et al., "Preventing Bad Plans by Bounding the Impact of Cardinality Estimation Errors", Proceedings of the VLDB Endowment, vol. 2, No. 1, 2019, (pp. 982-993. 12 total pages).

Babcock, Brian et al., "Towards a Robust Query Optimizer: A Principled and Practical Approach", SIGMOD, 2015, (pp. 119-130, 12 total pages).

* cited by examiner

800

| A | B | C | D | E | F | G |
|---|---|---|---|---|---|---|
| 0 | 0 | 1 | 1 | 1 | 1 | 1 |
| 0 | 0 | 1 | 1 | 1 | 0 | 0 |
| 0 | 1 | 0 | 1 | 0 | 0 | 1 |
| 1 | 1 | 1 | 0 | 1 | 1 | 1 |
| 0 | 1 | 0 | 0 | 1 | 0 | 0 |
| 0 | 0 | 1 | 0 | 1 | 1 | 1 |
| 0 | 0 | 0 | 0 | 1 | 1 | 1 |
| 0 | 0 | 0 | 0 | 0 | 0 | 0 |
| 1 | 0 | 1 | 1 | 1 | 1 | 1 |
| 0 | 1 | 1 | 1 | 1 | 1 | 1 |
| 0 | 0 | 0 | 0 | 0 | 0 | 1 |
| 1 | 1 | 1 | 0 | 1 | 1 | 1 |
| . | . | . | . | . | . | . |
| . | . | . | . | . | . | . |
| . | . | . | . | . | . | . |

| A | B | C | D | E | F | G |
|---|---|---|---|---|---|---|
| 0 |   | 1 | 1 | 1 | 1 | 1 |
| 0 |   | 1 | 1 | 1 | 0 | 0 |
| 0 |   | 0 | 1 | 0 | 0 | 1 |
| 1 |   | 1 | 0 | 1 | 1 | 1 |
| 0 |   | 0 | 0 | 1 | 0 | 0 |
| 0 |   | 1 | 0 | 1 | 1 | 1 |
| 0 |   | 0 | 0 | 1 | 1 | 1 |
| 0 |   | 0 | 0 | 0 | 0 | 0 |
| 0 |   | 1 | 1 | 1 | 1 | 1 |
| 0 |   | 1 | 1 | 1 | 1 | 1 |
| 0 |   | 0 | 0 | 0 | 0 | 1 |
| 1 |   | 1 | 0 | 1 | 1 | 1 |
| . |   | . | . | . | . | . |
| . |   | . | . | . | . | . |
| . |   | . | . | . | . | . |

| A | B | C | D | E | F | G |
|---|---|---|---|---|---|---|
|   | 0 |   | 1 | 1 | 1 | 1 |
|   | 0 |   | 1 | 1 | 0 | 0 |
|   | 0 |   | 1 | 0 | 0 | 1 |
|   | 1 |   | 0 | 1 | 1 | 1 |
|   | 0 |   | 0 | 1 | 0 | 0 |
|   | 0 |   | 0 | 1 | 1 | 1 |
|   | 0 |   | 0 | 1 | 0 | 1 |
|   | 0 |   | 0 | 0 | 0 | 0 |
|   | 0 |   | 1 | 1 | 1 | 1 |
|   | 0 |   | 1 | 0 | 1 | 1 |
|   | 1 |   | 0 | 1 | 1 | 1 |
|   | . |   | . | . | . | . |
|   | . |   | . | . | . | . |
|   | . |   | . | . | . | . |

| A | B | C | D | E | F | G |
|---|---|---|---|---|---|---|
|   | 0 |   | 1 |   | 1 |   |
|   | 0 |   | 1 |   | 0 |   |
|   | 0 |   | 1 |   | 0 |   |
|   | 1 |   | 0 |   | 1 |   |
|   | 0 |   | 0 |   | 0 |   |
|   | 0 |   | 0 |   | 1 |   |
|   | 0 |   | 0 |   | 1 |   |
|   | 0 |   | 0 |   | 0 |   |
|   | 0 |   | 1 |   | 1 |   |
|   | 0 |   | 1 |   | 0 |   |
|   | 1 |   | 0 |   | 1 |   |
|   | . |   | . |   | . |   |
|   | . |   | . |   | . |   |
|   | . |   | . |   | . |   |

FIG. 11

Algorithm 1: balanceEstimate

Input: subexpression $P_A$, $P_B$, Sample $S$
Output: estimated correlation $p(A|B)$ 1 def getShapeParams($k, m$):
   // implementation of Eqn. 8
2 def getBounds($k, m$):
3    return max($\frac{k-1}{m}, 0$), min($\frac{k+1}{m}, 1$)
4 def target$_{A|B}$($z_{A|B}$): // Eqn. 13
5    if $z_{A|B} = 0$ or $z_{A|B} = 1$ then return $\infty$
6    derive $z_{sub}$ according to rhs of Eqn. 9
7    cdf$_{A|B}$ = CDF($z_{A|B}, \mathfrak{B}(a_1, b_1)$)
8    cdf$_{A|\overline{B}}$ = CDF($z_{sub}, \mathfrak{B}(a_2, b_2)$)
9    return max(cdf$_{A|B}$/cdf$_{A|\overline{B}}$, cdf$_{A|\overline{B}}$/cdf$_{A|B}$)
10 def target$_{A|\overline{B}}$($z_{A|\overline{B}}$): // Eqn. 13
11    if $z_{A|\overline{B}} = 0$ or $z_{A|\overline{B}} = 1$ then return $\infty$
12    derive $z_{sub}$ according to lhs of Eqn. 9
13    cdf$_{A|\overline{B}}$ = CDF($z_{A|\overline{B}}, \mathfrak{B}(a_2, b_2)$)
14    cdf$_{A|B}$ = CDF($z_{sub}, \mathfrak{B}(a_1, b_1)$)
15    return max(cdf$_{A|B}$/cdf$_{A|\overline{B}}$, cdf$_{A|\overline{B}}$/cdf$_{A|B}$)
16 if $m_B = 0$ or $m_B = 1$ then // nothing to balance
17    return traditional estimate of $p(A)$
18 $a_1, b_1$ = getShapeParams(Cnt($P_A \wedge P_B, S$), Cnt($P_B, S$))
19 $a_2, b_2$ = getShapeParams(Cnt($P_A \wedge \overline{P_B}, S$), Cnt($\overline{P_B}, S$))
20 $z^{lo}_{A|B}, z^{hi}_{A|B}$ = getBounds(Cnt($P_A \wedge P_B, S$), Cnt($P_B, S$))
21 $z^{lo}_{A|\overline{B}}, z^{hi}_{A|\overline{B}}$ = getBounds(Cnt($P_A \wedge \overline{P_B}, S$), Cnt($\overline{P_B}, S$))
   // minimize target function
22 if $z^{hi}_{A|B} - z^{lo}_{A|B} < z^{hi}_{A|\overline{B}} - z^{lo}_{A|\overline{B}}$ then
23    $z'_{A|B}$ = Brent(target$_{A|B}$, ($z^{lo}_{A|B}, z^{hi}_{A|B}$))
24 else
25    $z'_{A|\overline{B}}$ = Brent(target$_{A|\overline{B}}$, ($z^{lo}_{A|\overline{B}}, z^{hi}_{A|\overline{B}}$))
26    derive $z'_{A|B}$ wrt. lhs of Eqn. 9, using $z_{A|\overline{B}} = z'_{A|\overline{B}}$
27 return $z'_{A|B}$

FIG. 12

```
Algorithm 2: estimateSelectivity
  Input: enumer. pred. allPred, sample S
  Output: selectivity estimate of full conjunction
1 m = |S| // number of rows in S
2 selectivity = 1; visitedPred = empty list
3 P_all = Conjunction of predicates in allPred
4 if Cnt(P_all, S) ≥ 1 then // traditional estimate
5    return Cnt(P_all, S)/m
  /* start first phase                                    */
6 for Predicate P_new in allPred do
7    residualPred = allPred\visitedPred // setminus
8    P_vis = conjunction of predicates in visitedPred
9    P_res = conjunction of predicates in residualPred
10   p_B = max(Cnt(P_new, S)/m, ln(2)/(2m)) // Eqn. 7
11   if Cnt(P_vis ∧ P_new, S) > 0 then
12      use traditional estimate and continue
13   if Cnt(P_vis, S) = 0 and Cnt(P_res, S) ≠ 0 then
14      end first phase and start second phase
15   if Cnt(P_vis, S) = 0 and Cnt(P_res, S) = 0 then
16      selectivity = selectivity * p_B           // AVI
17   else // P_vis ∧ P_new leads to 0-TS, use beta
18      p'_{A|B} = balanceEstimate(P_vis, P_new, S)
19      selectivity = p'_{A|B} * p_B
20   add P_new to end of visitedPred
  /* start second phase                                   */
21 while visitedPred ≠ ∅ do
22   P_test = conjunction of predicates in visitedPred
23   if Cnt(P_test ∧ P_res, S) > 0 then
24      p_{A|B} = Cnt(P_test ∧ P_res, S)/Cnt(P_test, S)
25      return p_{A|B} * selectivity
26   if Cnt(P_test ∧ ¬P_res, S) > 0 then
27      p'_{A|B} = balanceEstimate(P_res, P_test, S)
28      return p'_{A|B} * selectivity
29   remove last predicate of visitedPred
30 return selectivity * Cnt(P_res, S)/m           // AVI
```

FIG. 13

SELECTIVITY ESTIMATION USING NON-QUALIFYING TUPLES

BACKGROUND

Modern database systems receive database queries from applications. The database queries specify particular data of one or more data sources. A database system determines a query execution plan based on a received database query and executes the query execution plan against the data sources to generate a result set.

A database system typically includes a query optimizer which selects one of several possible query execution plans for executing a query. For example, the query optimizer may determine an estimated cost of each of the several query execution plans and select a query execution plan associated with a smallest cost. The estimated costs may be determined in part based on database statistics. One such statistic is the estimated selectivity of the predicates of the received query.

Selectivity refers to a percentage of records of a table which are selected by the query predicates. Cardinality is determined by multiplying the selectivity by the number of records in the table. In order to estimate the selectivity/cardinality of particular query predicates for table R, the query may be executed against a random sampling of the records of table R and the number of sample records selected by the query is determined. The selected number is divided by the sample size to determine an estimated selectivity of the query on table R. An estimated cardinality for table R may then be determined by multiplying the estimated selectivity by a size of R. This technique is insufficient if the query selects no records of the sample table.

Conventional methods for addressing the above scenario is to determine a selectivity for each predicate of the query and to multiply the determined selectivities. The foregoing methods are often inaccurate, resulting in inaccurate determinations of execution plan costs and subsequent selection of a less-desirable query execution plan. Systems are desired to improve selectivity estimates.

BRIEF DESCRIPTION OF THE DRAWINGS

FIG. 8 illustrates bit vectors of a sample table corresponding to each predicate of a query according to some embodiments.

FIG. 9 illustrates combination of bit vectors of a sample table according to some embodiments.

FIG. 10 illustrates combination of bit vectors of a sample table according to some embodiments.

FIG. 11 illustrates combination of bit vectors of a sample table according to some embodiments.

FIG. 12 comprises pseudo code to balance selectivity estimates according to some embodiments.

FIG. 13 comprises pseudo code to estimate selectivity of a conjunction of predicates according to some embodiments.

DETAILED DESCRIPTION

The following description is provided to enable any person in the art to make and use the described embodiments and sets forth the best mode contemplated for carrying out some embodiments. Various modifications, however, will be readily apparent to those in the art.

Some embodiments provide improved estimates of selectivity via a statistical model which captures deviations between true and observed correlations of predicate selectivities. The statistical model allows balancing between the certainty of partial observations and the uncertainty of selectivities that cannot be modeled due to limitations in sampling sizes (i.e., zero qualifying tuples). Accordingly, in a zero qualifying tuple case, an initial selectivity estimate is determined and then adjusted based on the above-mentioned balancing.

Some embodiments may also provide improved estimates of selectivity in cases where the sample includes qualifying tuples and the true selectivity of a query predicate on the source table is known. Selectivities of query sub-expressions are determined in a traditional manner and these selectivities are adjusted in view of an estimated selectivity of a predicate determined based on the sample, the true selectivity of the predicate received from external sources, and a statistical model which incorporates observed correlations of predicate selectivities. The adjusted selectivities may then be used to estimate a selectivity of the full query on the source table.

More specifically, embodiments use partial correlations to improve the estimation accuracy in the case of zero qualifying tuples, exploiting statistical properties and Bayes' theorem:

$$p(A)=p(A|B)p(B)+p(A|\overline{B})p(\overline{B}),$$

where $p(\overline{B})=1-p(B)$. When no sample tuple qualifies, the traditional estimate implies $p(A|B)=0$ and $p(A|\overline{B})>0$, if $p(A)>0$. However, using an unbiased estimate for $p(A|B)$ in the zero qualifying tuple case introduces an inconsistency in Bayes' theorem. Both conditionals $p(A|B)$ and $p(A|\overline{B})$ can then be adjusted according to their respective certainty to satisfy the equation and resolve the inconsistency. The respective certainties are modeled using the Beta distribution B, which is a continuous probability density function with two shape parameters (a, b).

The Beta distribution may be derived for qualifying samples $k \geq 1$. Some embodiments further introduce an unbiased estimate for the zero qualifying tuple case and determine specific shape parameters in terms of the hypergeometric distribution. The inconsistency is resolved by adjusting the estimate based on the respective shape parameters, and a selectivity is derived using the adjusted estimate. Embodiments are further applicable to conjunctions including an arbitrary number of predicates.

Figure 1:
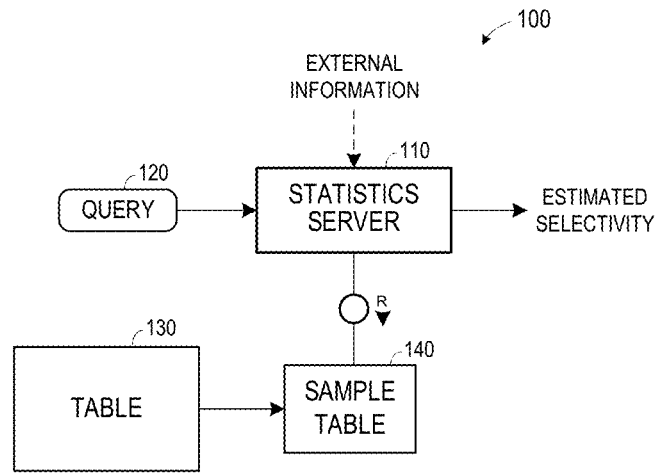
FIG. 1 is a block diagram of a system to estimate selectivity of a query on a table according to some embodiments.

FIG. 1 is a block diagram of system 100 according to some embodiments. The illustrated elements of system 100 may be implemented using any suitable combination of computing hardware and/or software that is or becomes known. In some embodiments, two or more elements of system 100 are implemented by a single computing device. One or more elements of system 100 may be implemented as a cloud service (e.g., Software-as-a-Service, Platform-as-a-Service).

Statistics server 110 determines an estimated selectivity of query 120 on table 130 based on sample table 140. Sample table 140 includes a subset of records of table 130 and may be generated using any sampling method that is or becomes known. Although embodiment are described herein with respect to a sample taken over a database table, embodiments may also be utilized to analyze a sample taken over a database view.

In some embodiments, statistics server 110 executes query 120 against sample table 140 and determines that query 120 selects very few or zero records of sample table 140. Statistics server 110 may generate an initial estimate of the selectivity of query 120 and then adjust the estimate based on a relative number of observations of two or more sub-expressions of query 120 within sample table 140. In other embodiments, the initial estimate is based on a significant number of selected records, but is adjusted based on externally-received information (e.g., an actual selectivity of a query predicate on table 130) and on a relative number of observations of two or more sub-expressions of query 140 within sample table 120.

Figure 2:
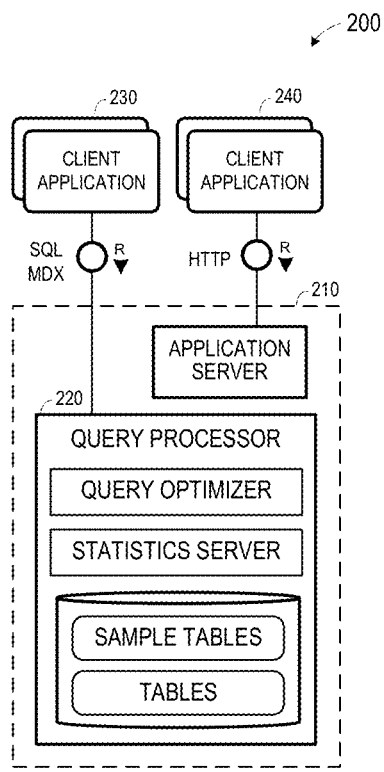
FIG. 2 is a block diagram of a database system according to some embodiments.

FIG. 2 is a block diagram of a distributed architecture which may determine query selectivities based on sample tables according to some embodiments. Embodiments are not limited to the FIG. 2 architecture.

Generally, server node 200 receives a query from client applications 230 and 240 and returns results thereto based on data stored within node 200. Node 200 executes program code to provide an application server and query processor 220. The application server provides services for executing server applications. For example, Web applications executing on an application server may receive HyperText Transfer Protocol (HTTP) requests from client applications 240 as shown in FIG. 2.

Query processor 220 contains the actual stored data and engines for processing the data. Query processor 220 is responsible for processing Structured Query Language (SQL) and Multi-Dimensional eXpression (MDX) statements and may receive such statements directly from client applications 230.

Query processor 220 includes a query optimizer for use in determining query execution plans and a statistics server for determining statistics for estimating query execution plan costs. The statistics server may generate such statistics as described herein based on stored sample tables. For example, in response to reception of a query on a stored table (or view) of server node 200, the statistics server may estimate selectivity of the query on the table (or view) based on a pre-generated and stored sample table which corresponds to the table (or view). According to some embodiments, the statistics server of query processor 220 comprises an implementation of statistics server 110 to generate such estimates.

In some embodiments, the data of server node 200 may comprise one or more of conventional tabular data, row-based data, column-based data, and object-based data. Moreover, the data may be indexed and/or selectively replicated in an index to allow fast searching and retrieval thereof. Server node 200 may support multi-tenancy to separately support multiple unrelated clients by providing multiple logical database systems which are programmatically isolated from one another.

Server nodes 200 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 3:
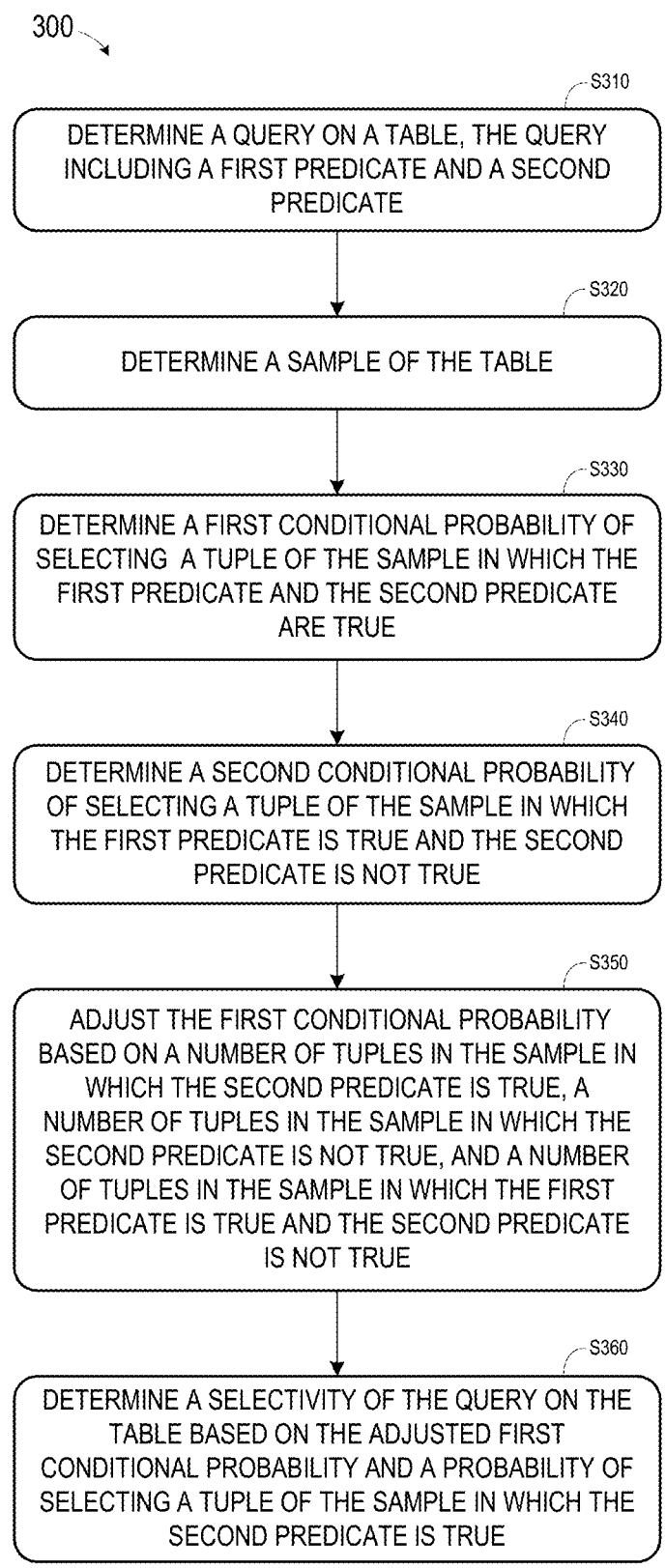
FIG. 3 comprises a flow diagram to generate a sample table according to some embodiments.

FIG. 3 comprises a flow diagram of process 300 according to some embodiments. In some embodiments, various hardware elements of server node 200 execute program code to perform process 300. Process 300 and all other processes mentioned herein may be embodied in computer-executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A query on a table is initially determined at S310. In the present example, the query includes a first predicate and a second predicate. The query may include additional predicates, as will be explained below. Next, at S320, a sample of the table is determined using any technique that is or becomes known.

Let R be a set of tuples defining a table or view. A sample S⊆R may be generated by drawing tuples from R uniformly at random and without replacement. The number of tuples in R is denoted by n:=|R| and the sample size is denoted by m:=|S|. The determined query q is defined as a conjunction of r simple predicates $q:=p_1 \wedge p_2 \ldots \wedge p_r$.

The result size of evaluating query q on relation R is defined as $l:=|R_q|$, corresponding to SELECT COUNT(*) FROM R WHERE q. Analogously, the result size of evaluating query q on sample S is $k:=|S_q|$. The total number of samples is given by the binomial coefficient $$\binom{n}{m}$$

and the total number of samples of size m with exactly k qualifying tuples is $$\binom{n-l}{m-k}\binom{l}{k}.$$

Since every sample is equally likely, the probability of observing k qualifying sample tuples is:

$$P(n,m,k,l) \approx \frac{\binom{n-l}{m-k}\binom{l}{k}}{\binom{n}{m}}$$

Accordingly, given k qualifying sample tuples in sample S, the number l of qualifying tuples of relation R may be estimated as $$l = n\frac{k}{m}, \text{ where } \frac{k}{m}$$

is the selectivity of query q on sample S.

Figures 4, 5, 6:
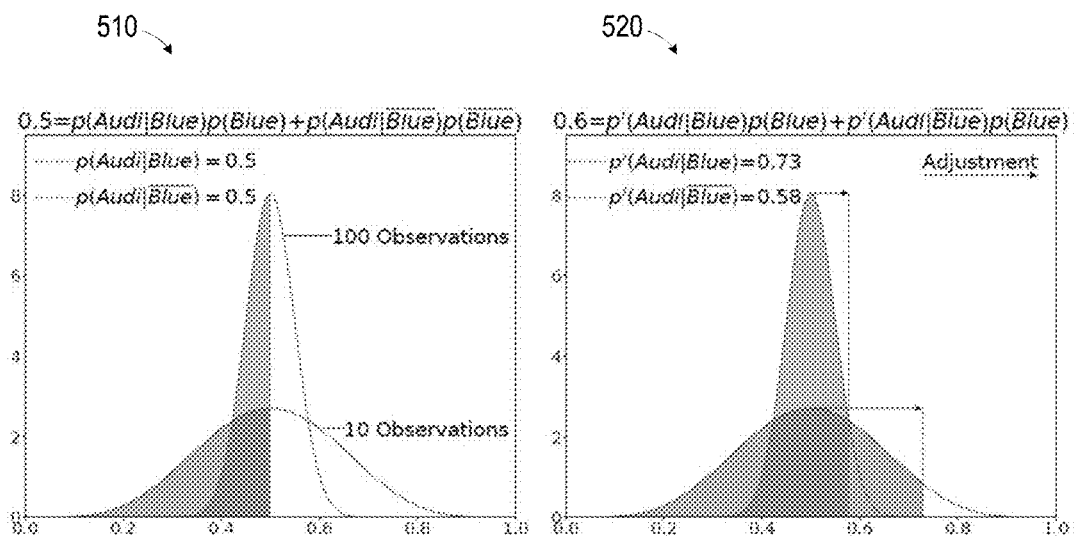
FIG. 4 depicts characteristics of a sample table according to some embodiments.
FIG. 5 illustrates adjustment of estimated selectivities based on external information and relative numbers of observations according to some embodiments.
FIG. 6 illustrates a sample table and corresponding bit vectors according to some embodiments.

A first conditional probability is determined at S330. The first conditional probability is a probability of selecting a tuple of the sample in which the first predicate and the second predicate are True. For example, it will be assumed that the source table is a relation R containing columns associated with car brand and car color. A sample of the source table is acquired at S320. FIG. 4 illustrates characteristics 400 of the sample, including sample size m=110, number of observations of "Audi" in the brand column (i.e., 55), and number of observations of "Blue" in the color column (i.e., 10). Based on the sample size m=110 and number of observations of "Audi" (i.e., 55), characteristics 400 indicate that half of the cars are Audis, hence p(Audi)=0.5.

Characteristics 400 also indicate the conditional probability p(Audi|Blue), which is the probability of observing a tuple having the first predicate Audi in a sample prefiltered by the second predicate color=Blue. Specifically, 5 out of 10 Blue cars are also Audis and the first conditional probability p(Audi|Blue)=0.5.

A second conditional probability is determined at S340. The second conditional probability is a probability of selecting a tuple of the sample in which the first predicate is True and the second predicate is False. According to characteristics 400, 50 out of 100 tuples include Audi but a different color than Blue and therefore the second conditional probability p(Audi|$\overline{\text{Blue}}$)=0.5.

Next, at S350, the first conditional probability is adjusted. The first conditional probability is adjusted based on a number of tuples in the sample in which the second predicate is True, a number of tuples in the sample in which the second predicate is not True, and a number of tuples in the sample in which the first predicate is True and the second predicate is not True.

The adjustment at S350 takes into account a relative number of observations underlying each estimated probability, under the assumption that more observations corresponds to greater certainty. For example, both observed conditional probabilities p(Audi|Blue) and p(Audi|$\overline{\text{Blue}}$) have the same expected value of 0.5. However, since there are more observations of tuples satisfying Audi|$\overline{\text{Blue}}$, it is assumed that the real probability $\tilde{p}$(Audi|$\overline{\text{Blue}}$) with respect to source table R deviates less from p(Audi|$\overline{\text{Blue}}$) than does real probability $\tilde{p}$(Audi|Blue) deviate from p(Audi|Blue).

According to some embodiments, the conditional probabilities may be modeled by a probability density function derived from a Bernoulli process for which the integral from 0 to the observed selectivity $$\frac{k}{m}$$

is 0.5 and which integrates to 1. Such a function, referred to herein as Beta distribution B(a, b) with the right choice of parameters (a, b), coincides with the assumption that it is equally likely to under- and overestimate the real selectivity $\tilde{p}$(Audi|Blue) based on k. Plot 510 of FIG. 5 illustrates such a distribution according to the present example. The x-axis represents the expected selectivity k/m and the y-axis represents the respective probability density. It can be seen that more observations lead to a steeper slope, less variance and therefore more certainty.

Accordingly, the adjustment of S350 may include balancing predicate selectivities according to their certainty. The intent of S350 is to adjust p(Audi|Blue) and p(Audi|$\overline{\text{Blue}}$) such that: (1) The adjusted estimates are consistent with Bayes' theorem; and (2) The adjusted estimates share the same probability of underestimating (overestimating) their true selectivity.

To illustrate, it is assumed that an external statistic is known, providing a true selectivity of a single query predicate on source table R. In the present example, the true selectivity $\tilde{p}$(Audi)=0.6 is assumed to be known. This value contradicts the observed sample where p(Audi)=0.5. While the observed p(Blue) might still be true despite this contradiction, the conditional probabilities p(Audi|Blue) and p(Audi|$\overline{\text{Blue}}$) have to be reconsidered in view thereof. Using Bayes' theorem for conditionals, the single predicate selectivity may be connected to the observed correlations as follows: p(A)=p(A|B)p(B)+p(A|$\overline{\text{B}}$)p($\overline{\text{B}}$), with p($\overline{\text{B}}$)=1−p(B).

Adjustments according to the present example are depicted in diagram 520 of FIG. 5, which shows that more observations result in more certainty, which in turn results in less adjustment to a corresponding distribution. The uncertainty is balanced by equally distributing the probability mass among the two estimates. The beta distribution B enables integration of external information with sampling data to consistently re-adjust the combined selectivity estimate.

Derivation of the beta distribution B according to some embodiments is now described. Let $S=s_1, \ldots, s_m$ be the sample, where $s_1, \ldots, s_m$ are the respective tuples and q a query predicate. A bitvector $X=\langle x_1, \ldots, x_m \rangle$ can be derived from S by evaluating q over S. The $i^{th}$ entry in X is set to 1 if and only if q satisfies the $i^{th}$ sample tuple from S. Traditional sampling based estimators would terminate at this point and return the estimate $$p = \frac{k}{m}.$$

However, embodiments are not only interested in the point estimate but also in the likelihood of the true selectivity $\tilde{p}$ deviating from p. Since the real fraction of satisfying tuples $\tilde{p}$ is unknown, it will be treated as a random variable of a function depending on X. In particular, the conditional density function $f$ ($\tilde{p}=z|X$) is desired, with $Pr[(a \leq \tilde{p} \leq b)] = \int_a^b f(\tilde{p}=z|X)dz$ which is derived as follows.

First, the conditional probability is transformed using Bayes' rule:

$$f(\tilde{p} = z \mid X) = \frac{Pr[X \mid \tilde{p} = z]f(z)}{\int_0^1 Pr[X \mid \tilde{p} = y]f(y)dy}$$

Because m≪n holds, and the sample tuples are selected independently and uniformly at random, the probability $Pr[X|\tilde{p}=z]$ can be modeled as Bernoulli process.

$$Pr[X|\tilde{p}=z]=z^k(1-z)^{m-k}$$

The function $f(z)$ is a probability distribution independent of X, which may be referred to as prior distribution. By setting $f(z) \propto z^{-\alpha}(1-z)^{-\alpha}$, $\alpha \in (0,1)$, the following probability density function conditioned on X is obtained:

$$f(\tilde{p} = z \mid X) = \frac{z^{k-\alpha}(1-z)^{m-k-\alpha}}{\int_0^1 y^{k-\alpha}(1-y)^{m-k-\alpha} dy}$$

This is known as the beta distribution B with shape parameters $(a, b) = (k+1-\alpha, m-k+1)$. The denominator of the above is independent of z and can be seen as a normalizing constant. Since the equation is a probability density function and $0 \leq z \leq 1$, $\int_0^1 f(\tilde{p}=z|X)dz=1$ must hold true. Narrowing the integral's upper bound leads to the cumulative beta distribution (CDF):

$$CDF(x, B(a,b)) = \int_0^x f(\tilde{p}=z|X)dz = 1 - \int_x^1 f(\tilde{p}=z|X)dz$$

The cumulative distribution therefore describes how likely $\tilde{p}$ is underestimated (overestimated) given X. Since $$p = \frac{k}{m}$$

is expected to be the median, $\alpha$ is sought such that:

$$CDF(x, B(a,b)) =$$
$$\int_0^x f(\tilde{p}=z|X)dz = \int_x^1 f(\tilde{p}=z|X)dz \Leftrightarrow Pr\left[\tilde{p} \leq \frac{k}{m} \mid X\right] =$$
$$Pr\left[\tilde{p} \geq \frac{k}{m} \mid X\right] = 0.5 \Leftrightarrow median(B(a,b)) = \frac{k}{m}$$

A good closed form approximation of the median is as follows:

$$\frac{a - \frac{1}{3}}{a + b - \frac{2}{3}} \approx median(B(a,b)), \text{ for } a, b > 1$$

$$b > 1$$

Substituting $a = k+1-\alpha$, $b = m-k+1-\alpha$ with $\alpha = \frac{2}{3}$ gives:

$$\frac{k + 1 - \frac{2}{3} - \frac{1}{3}}{k + 1 - \frac{2}{3} + m - k + 1 - \frac{2}{3} - \frac{2}{3}} = \frac{k}{k + m - k} = \frac{k}{m}$$

Given the approximation, it is concluded that for $\alpha = \frac{2}{3}$ the median of the respective beta distribution indeed becomes $$\frac{k}{m}.$$

Since $\tilde{p}(Audi) = 0.6 \neq 0.5 = p(Audi)$, the above equation is no longer satisfied. S350 involves adjusting $p(Audi|Blue)$ and $p(Audi|\overline{Blue})$ in order to satisfy the equation. Treating $p(A|B), p(A|\overline{B})$ as variables $z_{A|B}$, $z_{A|\overline{B}}$ gives raise to a space of solutions, where $$z_{A|B} = \frac{p(A) - p(\overline{B}z)_{A|\overline{B}}}{p(B)}, z_{A|\overline{B}} = \frac{p(A) - p(B)z_{A|B}}{p(\overline{B})}$$

must hold ($0 < p(B) < 1$). Further, let $\mathbb{X} = \langle X_A, X_B \rangle$ be a matrix with $X_A$, $X_B$ as bitvector where the $i^{th}$ entry of $X_A$ is set to 1 if and only if the $i^{th}$ sample tuple is an Audi and the $i^{th}$ entry of $X_B$ is set to 1 if and only if the $i^{th}$ sample tuple is a Blue. Deriving the distribution B for both conditional probabilities gives:

$$f(\tilde{p}(A|B) = z \mid \mathbb{X}) = f(z_{A|B} = z \mid X^+) = B_{A|B}$$

$$f(\tilde{p}(A|\overline{B}) = z \mid \mathbb{X}) = f(z_{A|\overline{B}} = z \mid X^-) = B_{A|\overline{B}},$$

where $X^+$ ($X^-$) is the bit vector containing the $i^{th}$ entry of $X_A$ if and only if the $i^{th}$ entry of $X_B$ equals 1 (0). FIG. 6 illustrates $X_A^+$ and $X_A^-$ and corresponding bit vectors $X_A$ and $X_B$ for a given sample table.

S350 includes solving the imposed inconsistency in a way that is most consistent with the observed sample. $p(A|B)' = z_{A|B}$, $p'(A|\overline{B}) = z_{A|\overline{B}}$ are defined as a consistent adjustment if the probability of underestimating (overestimating) $p'(A|B)$ is equal to the probability of underestimating (overestimating) $p'(A|\overline{B})$. That is, a solution is desired in which:

$$p(A) = p(B)z_{A|B} + p(\overline{B})z_{A|\overline{B}} \text{ and}$$

$$CDF(z_{A|B}, B_{A|B}) = CDF(z_{A|\overline{B}}, B_{A|\overline{B}})$$

holds.

By substituting $z_{A|B}$ with $$\frac{p(A) - p(\overline{B})z_{A|\overline{B}}}{p(B)},$$

it is observed that the constrained solution to $p(A) = p(B)z_{A|B} + p(\overline{B})z_{A|\overline{B}}$ is always unique. Since more observations exist for $p(Audi|\overline{Blue})$ than for $p(Audi|Blue)$, the beta distribution modeled under $X^-$ has a steeper slope than $B_{A|B}$. The cumulative distribution function of $B_{A|\overline{B}}$ is therefore changing faster compared to $CDF(z_{A|B}, B_{A|B})$. Due to the faster change of $CDF(z_{A|\overline{B}}, B_{A|\overline{B}})$, less adjustment of $z_{A|\overline{B}}$ is needed to meet the same value as $CDF(z_{A|B}, B_{A|B})$.

Returning to process 300, the adjusted first conditional probability is used to determine the selectivity of the query on the table at S360. Specifically, the adjusted first conditional probability is multiplied with the probability of selecting a tuple of the sample in which the second predicate is true. In the present example, the selectivity of query Audi and Blue is determined by multiplying adjusted $p(Audi|Blue)$ with $p(Blue)$.

Process 300 may also be used to balance the certainty of observed correlations from the sample in a case where no tuples of the sample are selected by the query. Since the sample-derived conditional probability is zero, an unbiased initial estimate for $l = |R_q|$ is determined. Second, the beta distribution is modeled with regard to l, where $$p = \frac{l}{n}$$

is the median. Next, the initial estimate is adjusted according to the certainty of the (partial) correlations given by S. In other words, the certainty and uncertainty of the observations are balanced, where the uncertainty results from the limited sample size.

Providing an unbiased estimate for $$p_0 = \frac{l}{n}$$

with respect to the hypergeometric distribution is not trivial when k=0. The sample is assumed to be representative but too small, i.e.

$$0 \le p_0 = \frac{l}{n} < \frac{1}{m}$$

(otherwise $P_0$ could have been modelled by the sample). If it were possible to observe fractions of qualifying tuples, the fraction would be expected to fall between k=0 and k=1 qualifying sample tuples. Due to the lack of additional information, $k_0=0.5$ may be an initial estimate as it is equidistant from k=0 and k=1. Accordingly, the probability of seeing less than 0.5 qualifying sample tuples should be equally likely to observing more than 0.5 tuples. Therefore, given n, m, X~hypergeometric(n, m, l) and according to the preliminary considerations l is sought such that:

$$Pr[X \le k_0 = 0.5] \ge \frac{1}{2} \text{ and } Pr[X \ge k_0 = 0.5] \ge \frac{1}{2}$$

However, X relates to a discrete distribution, and since there cannot be half a qualifying tuple and $Pr[X \le k_0 = 0.5] = Pr[X < k=1] = Pr[X=k=0]$, the above equation would hold true for every $k_0 \in [0,1]$. In this case there is no unique solution and 0.5 refers to a so called weak median [13].

However, for $\tilde{X}$~hypergeometric(n, 2m, l) it can be assumed that $$Pr[\tilde{X} \le k=1] \ge \frac{1}{2} \text{ and } Pr[\tilde{X} \ge k=1] \ge \frac{1}{2}$$

$$\Leftarrow Pr[\tilde{X}=k=0] = P(n, 2m, k=0, l) = \frac{1}{2}$$

Therefore, by doubling the sample size k=1 becomes the strong median of $\tilde{X}$, giving raise to a unique solution of l. Accordingly, a number of qualifying relation tuples is determined which provides a 50% chance of observing at least one qualifying sample tuple when considering a sample twice the size. Given m, n, a solution to P(n, 2m, k=0, l)=0.5 is given by:

$$l = n \frac{\ln(2)}{2m}$$

An initial and unbiased estimate for the fraction of qualifying tuples in view of a sample having no qualifying tuples is $$p_0 = \frac{\ln(2)}{2m}.$$

Accordingly, the first conditional probability determined at S330 is $$p_0 = \frac{\ln(2)}{2m}$$

in the case or a sample having no qualifying tuples.

In order to adjust this first conditional probability at S350 according to partially observed correlations, it is first modeled as a distribution as described above. When no sample tuple qualifies for the given predicate, a beta distribution $B_0 = B(a, b)$ is determined with $$\text{median}(B(a, b)) = p_0 = \frac{\ln(2)}{2m}.$$

The closed form approximation for the median noted above may be used to derive the respective shape parameters (a, b). The approximation is however constrained by a, b>1, and k=0 is a special case in which the median needs to be $$\frac{\ln(2)}{2m}$$

instead of $$\frac{k}{m}.$$

Substituting a according to the approximation gives $$a = \frac{\ln(2)}{2} + 1 - \alpha = \frac{\ln(2)}{2} + \frac{1}{3} < 1,$$

thus violating the constraint and leading to a significant approximation error of ~10%. The inventors have numerically determined that $a_0=0.634$, $b_0=m$ provides a consistently accurate approximation of the beta distribution shape parameters for the zero tuple case, where $$\text{median}(B(a_0 = 0.634, b_0 = m)) \approx \frac{\ln(2)}{2m} = p_0.$$

It can be shown numerically that using $a_0=0.634$, $b_0=m$ provides a relative error less than 1% for m>1, which is rapidly decreasing (less than 0.1% for m≥10).

The above discussion provides an unbiased initial estimate for non-qualifying samples where 0.5 tuples are the strong median. Considering one qualifying tuple as a strong median, it becomes straightforward to apply $$l = n \frac{\ln(2)}{m}$$

directly. This provides a 50% chance of observing a non-qualifying sample and a 50% chance of observing at least one qualifying tuple, i.e.:

$$P(n, m, k = 0, l) = P(n, m, k \geq 1, l) = 0.5 \Leftrightarrow l = n\frac{\ln(2)}{m}$$

The following summarizes the shape parameters (a, b) for the beta distribution depending on the (partial) observation:

$$(a, b) = \begin{cases} \left(k + \frac{1}{3}, m - k + \frac{1}{3}\right) & \text{if } k \geq 1, m \geq 1 \\ (a_0 = 0.634, b_0 = m) & \text{if } k = 0, m \geq 1 \\ (1, 1) & \text{if } k = 0, m = 0 \end{cases}$$

The above provides a beta distribution that models the uncertainty of an initial estimate $p_0$ that can not be directly observed by the sample. Instead of setting $p_0=0$ as observed in the zero qualifying tuple case, $$p_0 = \frac{\ln(2)}{2m}$$

is used. The use of $$p_0 = \frac{\ln(2)}{2m}$$

introduces an inconsistency to the above equation $p(A)=p(A|B)p(B)+p(A|\overline{B})p(\overline{B})$. $p_0$ may then be adjusted to resolve the inconsistency based on the certainty of observable correlations and therefore balance the uncertainty and certainty.

Returning to the prior example of FIGS. 4 and 5, it will be assumed that the sample does not include any tuples satisfying a query for Blue Audi. In particular, 55 of 110 cars are Audis but with a color different than Blue and 10 cars are Blue but not Audis. The uncertainty of p(Audi|Blue) can then be modeled at S330 as the conditional density function $f(\tilde{p}_0(A|B)=z| \mathbb{X})=f(z_{A|B}=z|X^+)=B(0.634, 10)$.

Based on the example, the shape parameters for the second conditional density function (i.e., beta distribution) are derived at S340 as:

$$(a,b)=(k_{A\overline{B}}+\tfrac{1}{3}, m_{A\overline{B}}-k_{A\overline{B}}+\tfrac{1}{3})=(55+\tfrac{1}{3}, 100-55+\tfrac{1}{3})$$

Accordingly, the second conditional density function p(Audi|$\overline{\text{Blue}}$) is:

$$f(\tilde{p}(A|\overline{B})=z| \mathbb{X})=f=z|X^-)=B(55.\overline{33}, 45.\overline{33}),$$

with $\mathbb{X}=\langle X_A, X_B\rangle$, where $X_A$, $X_B$ are bit vectors of the respective sample columns and $X^+$, $X^-$ are separated from $X_A$ with respect to the boolean factor Blue of $X_B$.

Next, at S350 both conditional probabilities are treated as variables $z_{AB}$, $z_{A\overline{B}}$ to seek a solution to $p(\text{Audi})=z_{A|B}p(\text{Blue})+z_{A|\overline{B}}p(\overline{\text{Blue}})$ under the condition:

$$\text{CDF}(z_{A|B}, B(0.634, 10)) = \text{CDF}(z_{A|\overline{B}}, B(55.\overline{33}, 45.\overline{33}))$$

Solving $p(\text{Audi})=z_{A|B}p(\text{Blue})+z_{A|\overline{B}}p(\overline{\text{Blue}})$ in this manner gives the adjusted conditional probability $p_0$, (Audi|Blue)=$z_{AB}$. The fraction of Blue Audis in the sample and therefore the respective predicate selectivity may then be determined at S360 by: $p_0$,(Audi, Blue)=$z_{A|B}p(\text{Blue})=p_0$, (Audi|Blue)p(Blue). As a result, the estimated number of tuples of the source table which satisfy Audi and Blue is $n \cdot p_0$, (Audi, Blue).

As stated before, p(A|B) and p(A|$\overline{B}$) can be treated as variables $z_{A|B}$, $z_{A|\overline{B}}$. Either $z_{A|\overline{B}}$ or $z_{A|B}$ may be substituted in $$z_{A|B} = \frac{p(A) - p(\overline{B})z_{A|\overline{B}}}{p(B)}, \quad z_{A|\overline{B}} = \frac{p(A) - p(B)z_{A|B}}{p(\overline{B})}$$

to solve $p(\text{Audi})=z_{A|B}p(\text{Blue})+z_{A|\overline{B}}p(\overline{\text{Blue}})$. If $z_{A|B}$ is substituted by $$z_{sub} = \frac{p(A) - p(B)z_{A|B}}{1 - p(B)},$$

the problem can be reformulated as a solution to the following equation, which depends on only one variable:

$$\int_0^{z_{A|B}} f(\tilde{p}(A|B)=z|\mathbb{X})dz = \int_0^{z_{sub}} f(\tilde{p}(A|\overline{B})=z|\mathbb{X})dz$$

This equation may be solved via Brent's method, which is a combination of the bisection method, the secant method and inverse quadratic interpolation. An open source implementation of via Brent's method is provided by the C++ Boost library. After solving the equation, either $z_{A|\overline{B}}$ or $z_{A|B}$ can be back-substituted.

Brent's method requires as input a target function and bounds within which the minimum may be found. Some embodiments call Brent's method for two separate cases—representing both possibilities of $$z_{A|B} = \frac{p(A) - p(\overline{B})z_{A|\overline{B}}}{p(B)}, \quad z_{A|\overline{B}} = \frac{p(A) - p(B)z_{A|B}}{p(\overline{B})},$$

with each call having its own target function and bounds. According to some embodiments, the case for which the bounds are tighter is chosen for solving.

The following target function $\psi$ may be used in some embodiments:

$$\psi(z_{A|B}) := ((\text{CDF}(z_{A|B}, B_{A|B}) - \text{CDF}(z_{sub}, B_{A|\overline{B}}))^2,$$

where the cumulative distribution function can be computed efficiently for every value of $z_{A|B}$ ($z_{sub}$) by calling Boost's implementation of the incomplete beta function. However, since calculating the difference of two vastly different floating point numbers is imprecise, the following target function may be used:

$$\max\left(\frac{\text{CDF}(z_{A|B}, B_{A|B})}{\text{CDF}(z_{sub}, B_{A|\overline{B}})}, \frac{\text{CDF}(z_{sub}, B_{A|\overline{B}})}{\text{CDF}(z_{A|B}, B_{A|B})}\right)$$

Some embodiments employ two approaches to narrow down the search space of Brent's method. First, both $z_{A|B}$, $z_{A|\overline{B}}$ are substituted with their respective counterpart as in $$z_{A|B} = \frac{p(A) - p(\overline{B})z_{A|\overline{B}}}{p(B)}, \quad z_{A|\overline{B}} = \frac{p(A) - p(B)z_{A|B}}{p(\overline{B})}.$$

Second, under the assumption that the sample is accurate but unable to model the correct selectivity due to its limited size, $k_{obs}-1 < k_{true} < k_{obs}+1$. Substituting k with k−1, k+1 gives the respective lower and upper bound for Brent's method.

In a case that the sample constrained by the predicate over attribute B is empty, i.e.

$$m_B = 0 \left( p_B = \frac{\ln(2)}{2m} \right).$$

Then $B_{A|B}$ becomes the uniform distribution B(1,1). Since there is nothing to infer from the empty sample $z_{A|B}$ is set to 0 and 1 in order to derive the lower and upper bound for $z_{A|\overline{B}}$. Analogously, $z_{A|\overline{B}}$ is substituted in case of $$m_{\overline{B}} = 0 \left( p_B = 1 - \frac{\ln(2)}{2m} \right).$$

Considering a conjunction of two predicates (with no qualifying sample tuples), the selectivity estimation may be performed by intersecting two bit vectors and calling Brent's method with the aforementioned target function.

Figure 7A:
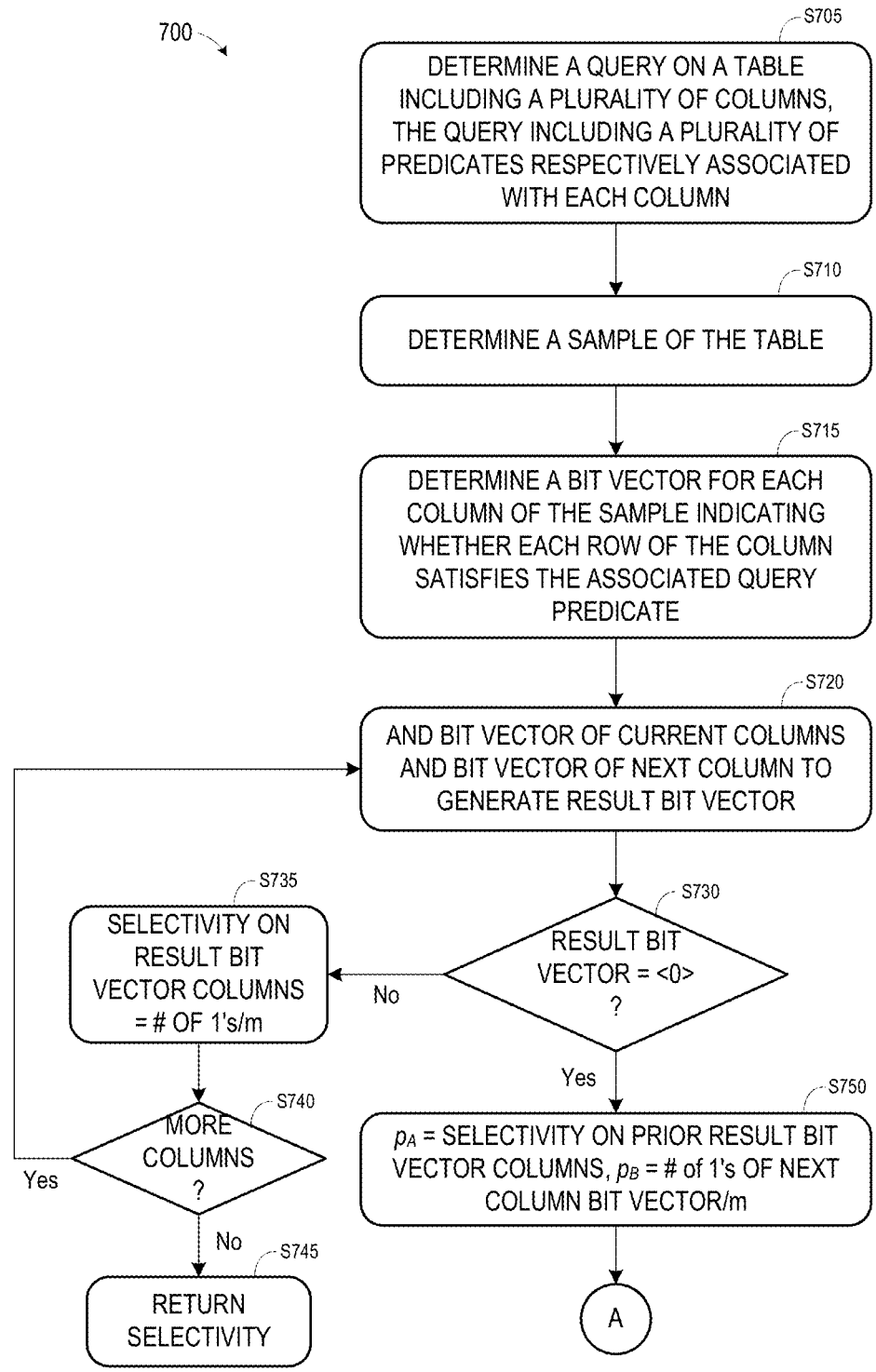
FIGS. 7A and 7B comprises a flow diagram to estimate selectivity of a query on a table according to some embodiments.
Figure 7B:
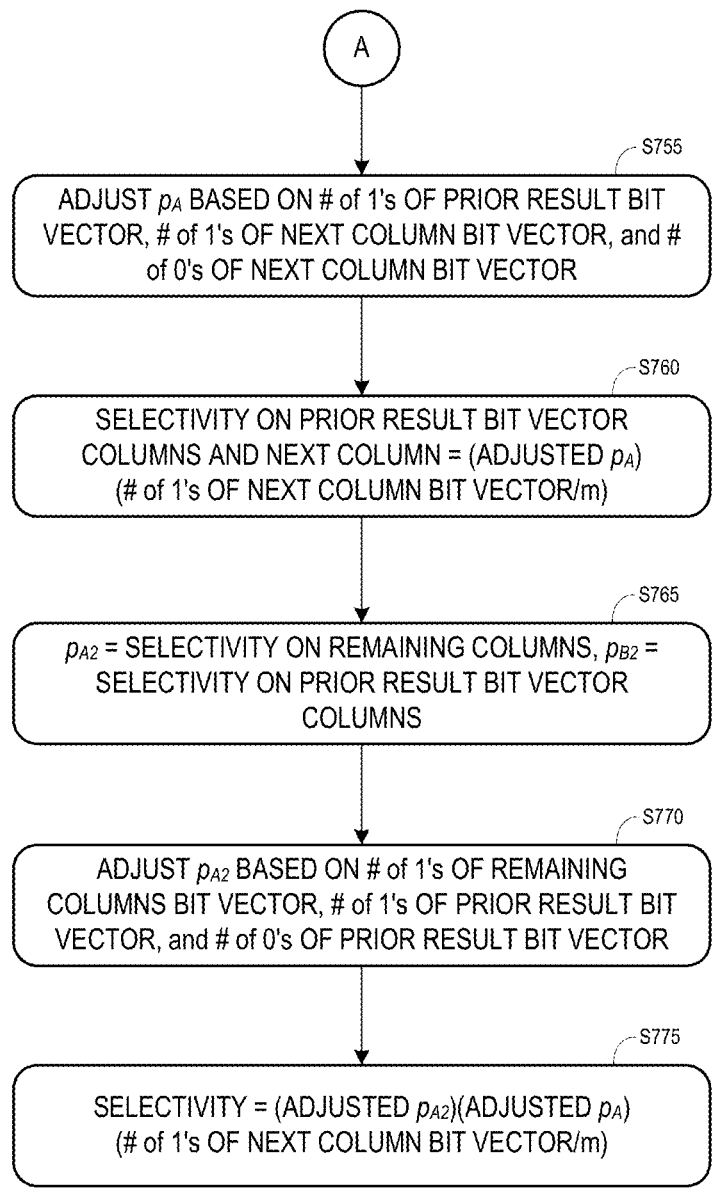

The above-described concepts may be used to estimate the combined selectivity of a conjunctive predicate, solely based on sampling. Generally, and as will be described with respect to process 700 of FIGS. 7A and 7B, a plurality of simple predicates and a table sample are received. If the sample includes at least one tuple satisfying the full conjunction of all predicates, the estimated selectivity is $$\frac{k}{m} \text{ if } k > 1 \text{ and } \frac{\ln(2)}{m} \text{ if } k = 1.$$

If no sample tuple satisfies the full conjunction of all predicates, as many predicates as possible are combined to a subexpression which is satisfied by at least one tuple of the sample. The selectivity of the subexpression is then adjusted as described above based on the relative number of observations of the subexpression and of a next simple predicate. Next, the residual predicates are combined and connected to the previously-visited predicates by determining the selectivities of the residual subexpression and adjusting this selectivity based on the relative number of observations of each subexpression.

With respect to process 700, a query on a table is determined. The table includes a plurality of columns and the query includes a plurality of predicates respectively associated with each column. The following discussion of process 700 assumes that all single predicates have at least one qualifying entry in their respective bit vector, i.e., only (partial) conjunctions lead to a null vector or no qualifying sample tuple, respectively.

A sample of the table is determined at S710 as described above. Next, at S715 a bit vector is determined for each of those columns of the sample which are associated with a predicate of the query. A bit vector for a given column includes a "1" or a "0" for each row of the sample, depending on whether the predicate associated with the given column is satisfied by the value of the column at the row. FIG. 8 illustrates bit vectors 800 of a sample table associated with each of predicates A-G of a received query according to one example.

At S720, a bit vector of a current column (i.e., A) is intersected (i.e., logical AND) with the bit vector of a next column to generate a result bit vector. FIG. 9 illustrates a result bit vector generated by intersecting the bit vector of column A with the bit vector of column B. Since the result bit vector is not empty (i.e., all "0"s) flow proceeds from S730 to S735. At S735, the (partial) selectivity associated with the columns of the result bit vector is determined as the number of "1"s in the result bit vector divided by the number of tuples (i.e., rows) in the sample.

It is determined at S740 that more predicate columns exist, flow returns to S720 to intersect the current result bit vector (associated with columns A and B) with the bit vector of a next column (column C). FIG. 10 illustrates a new result bit vector column associated with columns A, B and C. Since this result bit vector is not determined as empty at S730, a new selectivity is determined based on the result bit vector at S735 and flow returns to S720 via S740.

Generally, the consecutive bit vectors are intersected as long as qualifying entries in the result bit vector can be observed. If it is eventually determined at S740 that no further columns exist, then the sample includes at least one qualifying tuple and the last-determined selectivity is returned. In some embodiments, if the final result bit vector indicates the presence of only one qualifying tuple in the sample, a selectivity of $$\frac{\ln(2)}{m}$$

may be returned as described above.

Returning to the example, a result bit vector is then formed at S720 based on the result bit vector associated with columns A, B and C and the bit vector associated with column D. Since this bit vector includes all "0"s, flow proceeds from S730 to S750. At S750, first conditional probability $p_A$ is determined as equal to the last-determined selectivity (i.e., corresponding to the partial selectivity of the predicates associated with columns A, B and C) and second conditional probability $p_B$ is determined as equal to the number of "1"s of the next column (column D) bit vector divided by the sample size.

Next, and as described above, the first conditional probability (i.e., $p_A$=p(ABC)) is adjusted at S755 based on the number of "1"s of the result bit vector (i.e., $k_{ABC\overline{D}}$=countOnes($X_{ABC}$&¬$X_D$)), the number of "1"s of the next column bit vector (i.e., $m_D$=countOnes($X_D$)) and the number of "0"s of the next column bit vector (i.e., $m_{\overline{D}}$=countOnes(¬$X_D$)). These values provide both beta distributions $B_{ABC|D}$ and $B_{ABC|\overline{D}}$ with the following shape parameters:

$$B_{ABC|D}=B(a_0=0.634, b_0=m_D),$$

$$B_{ABC|\overline{D}}=B(k_{ABC\overline{D}}+0.33, m_{\overline{D}}-k_{ABC\overline{D}}+0.33)$$

As previously discussed $B_{ABC|D}$, $B_{ABC|\overline{D}}$ may be balanced at S855 by calling Brent's method with the respective target function so that CDF($z_{ADC|D}$, $B_{ADC|D}$)=CDF($z_{ABC|\overline{D}}$, $B_{ABC|\overline{D}}$) holds. The adjusted estimate p(ABC|D)=$z_{ABC|D}$ is returned, and the selectivity on columns A, B, C and D is determined at S760 as p(ABCD)=p(ABC|D)p(D).

Next, p(EFG|ABCD) is estimated by connecting the residual predicates and therefore the sample columns EFG. FIG. 11 illustrates a bit vector generated by intersecting the bit vectors of columns E, F and G. Given $X_{EFG} = X_E \& X_F \& X_G \neq \vec{0}$, some implementations may attempt to combine as many previously-visited predicates as possible. $X_A \& X_B$ may be prioritized over $X_B \& X_C$ assuming that the plan starts with the most selective and anti-correlated predicates. In the present example, $X_{EFG} \& X_{AB} \neq \vec{0}$, while $X_{EFG} \& X_{ABC} = \vec{0}$. Since $X_{EFGABC} = \vec{0}$ and $X_{EFG}, X_{ABC} \neq 0$, it follows that that $X_{EFG} \& \neg X_{ABC} \neq \vec{0}$.

At S765, $p_{A2} = p(EFG)$, $p_{B2} = p(ABC)$, and $\mathbb{X} = \langle X_{EFG}, X_{ABC} \rangle$. $p_{A2}$ is then adjusted at S770 as described herein. More specifically, the first conditional probability (i.e., $p_{A2}$) is adjusted at S770 based on the number of "1"s of the remaining columns combined bit vector (i.e., $k_{\overline{EFGABC}} = \text{countOnes}(X_{\overline{EFGABC}})$), the number of "1"s of the prior result bit vector (i.e., $m_{ABC} = \text{countOnes}(X_{ABC})$), and the number of "0"s of the prior result bit vector (i.e., $m_{\overline{ABC}} = \text{countOnes}(\neg X_{ABC})$). These values provide the following beta distributions:

$$B_1 = B(a_0 = 0.634, b_0 = m_{ABC}),$$

$$B_2 = B(k_{EFG\overline{ABC}} + 0.\overline{33}, m_{ABC} - k_{EFG\overline{ABC}} 0.\overline{33}),$$

which are balanced as described above to return p(EFG|ABC). The selectivity estimate of the full conjunctive predicate then reads:

$$p(ABCDEFG) = p(EFG|ABC)p(ABC|D)p(D).$$

Instead of relying on a fixed order of predicates, the above algorithm may use a greedy heuristic. This implementation may take a set of simple predicates as input and return the enumerated predicates along with their combined selectivity. In the first phase, the predicates are enumerated according to the heuristic. If, for example, the predicates over ABC are already enumerated and adding any of the residual predicates leads to zero qualifying tuples, then the selectivity of the first subexpression that results in a non-qualifying sample is estimated. However, besides p(ABCD), estimates are provided for p(ABCE), p(ABCF) and p(ABCG). According to the heuristic, the subexpression with the best cost to selectivity ratio is selected, e.g. p(ABCD).

Then, assuming that qualifying tuples for the combined subexpression over EFG, p(ABCDE)=p(E|ABC)p(ABCD) and p(ABCDF), p(ABCDG) are estimated. If p(ABCDE) has been selected, the process continues with p(ABCDEF)=p(FE|ABC) (ABCD), etc., where all combinations of residual predicates (e.g., the subexpression over FE) are treated as a single predicate.

Enumeration is not limited to the greedy heuristic. The enumerator could separately shuffle subexpressions according to any policy while continuously proposing (partial) plans.

FIG. 12 comprises pseudo code to balance selectivity estimates according to some embodiments. The code receives a sample S and two conditional probabilities p(A) and p(B) and outputs an estimated correlation p(A|B). The code describes an implementation which may be employed in some embodiments of S350, S755 and S770.

FIG. 13 comprises pseudo code to estimate selectivity of a conjunction of predicates according to some embodiments. The pseudo code of FIG. 13 may therefore comprise an implementation of process 700. As shown and noted above, execution of the pseudo code of FIG. 13 may include execution of an algorithm such as the pseudo code of FIG. 12 (e.g., at S755 and S770). It should be noted that the function $\text{Cnt}(P_A, S)$ counts qualifying sample tuples for predicate $P_A$ and corresponds to the notation $\text{countOnes}(X_A)$ above.

Figure 14:
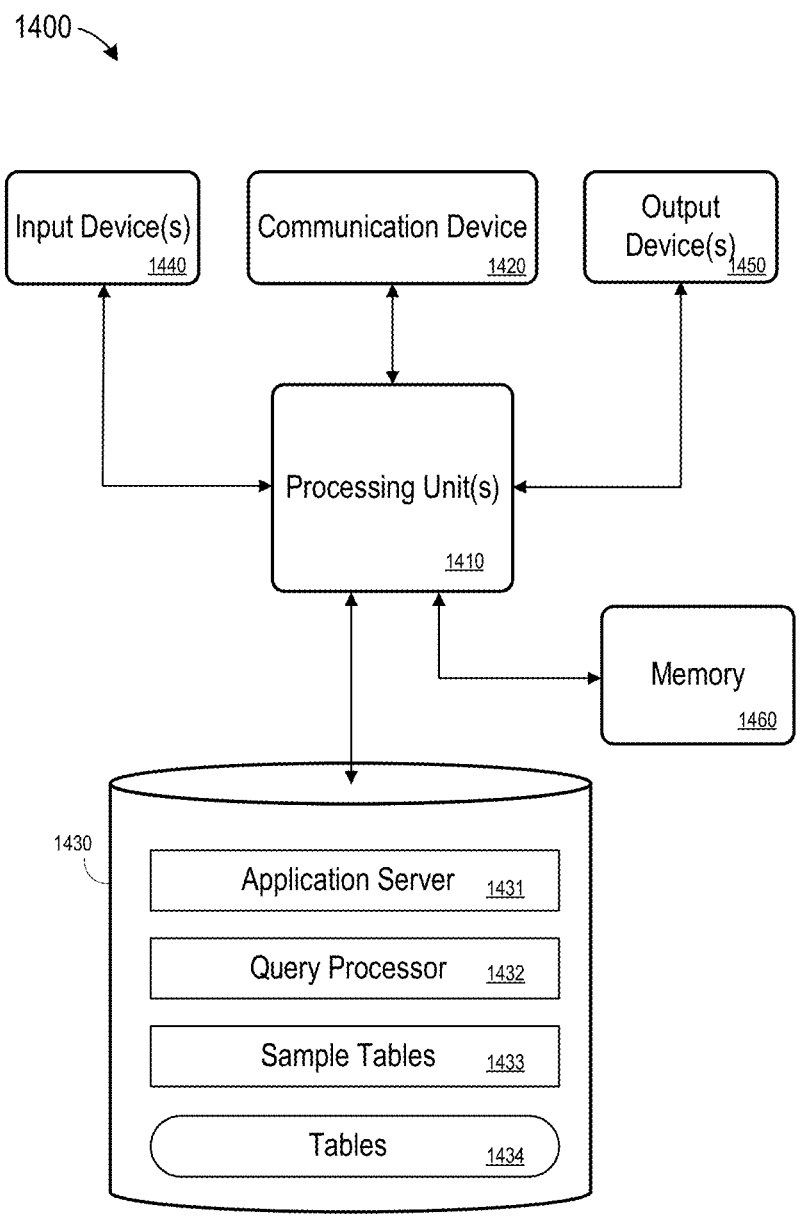
FIG. 14 is a block diagram of a database node according to some embodiments.

FIG. 14 is a block diagram of server node 1400 according to some embodiments. Server node 1400 may comprise a general-purpose computing apparatus and may execute program code to perform any of the functions described herein. Server node 1400 may comprise an implementation of server node 200 in some embodiments. Server node 1400 may include other unshown elements according to some embodiments.

Server node 1400 includes processing unit(s) 1410 operatively coupled to communication device 1420, data storage device 1430, one or more input devices 1440, one or more output devices 1450 and memory 1460. Communication device 1420 may facilitate communication with external devices, such as an external network or a data storage device. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to enter information into apparatus 1400. Output device(s) 1450 may comprise, for example, a display (e.g., a display screen) a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, etc., while memory 1460 may comprise Random Access Memory (RAM).

Application server 1431 and query processor 1432 may each comprise program code executed by processor(s) 1410 to cause server 1400 to perform any one or more of the processes described herein. Such processes may include estimating selectivities of queries on tables 1434 based on corresponding sample tables 1433. Embodiments are not limited to execution of these processes by a single computing device. Data storage device 1430 may also store data and other program code for providing additional functionality and/or which are necessary for operation of server 1400, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing processor-executable program code; and
   a processing unit to execute the processor-executable program code in order to cause the system to:

determine a query on a table, the query including a first predicate and a second predicate;
determine a sample of the table, the sample comprising a plurality of tuples of the table;
determine a first conditional probability of selecting a tuple of the sample satisfying the first predicate and the second predicate by:
  determination of a number of tuples of the sample which satisfy the first predicate and the second predicate; and
  determination of the first conditional probability based on the number of tuples of the sample which satisfy the first predicate and the second predicate divided by the number of tuples of the sample;
determine a second conditional probability of selecting a tuple of the sample satisfying the first predicate and not satisfying the second predicate;
adjust the first conditional probability based on the first conditional probability, the second conditional probability, a selectivity of the first predicate on the table, a number of tuples of the sample satisfying the second predicate, a number of tuples of the sample not satisfying the second predicate, and a number of tuples of the sample satisfying the first predicate and not satisfying the second predicate; and
determine a selectivity of the query on the table based on the first adjusted conditional probability.

2. A system according to claim 1, wherein determination of the selectivity of the query on the table comprises multiplying the first adjusted conditional probability and a probability of selecting a tuple of the sample satisfying the second predicate.

3. A system according to claim 1, wherein determination of the first conditional probability comprises:
  determination that no tuples of the sample satisfy the first predicate and the second predicate; and
  in response to the determination that no tuples of the sample satisfy the first predicate and the second predicate, determine the first conditional probability as equal to $$\frac{\ln(2)}{2m},$$

where m is a number of tuples in the sample.

4. A system according to claim 3, wherein determination of the selectivity of the query on the table comprises multiplying the first adjusted conditional probability and a probability of selecting a tuple of the sample satisfying the second predicate.

5. A computer-implemented method comprising:
determining a query on a table, the query including a first predicate and a second predicate;
determining a sample of the table, the sample comprising a plurality of tuples of the table;
determining a first conditional probability of selecting a tuple of the sample satisfying the first predicate and the second predicate by:
  determining a number of tuples of the sample which satisfy the first predicate and the second predicate; and
  determining the first conditional probability based on the number of tuples of the sample which satisfy the first predicate and the second predicate divided by the number of tuples of the sample;
determining a second conditional probability of selecting a tuple of the sample satisfying the first predicate and not satisfying the second predicate;
adjusting the first conditional probability based on the first conditional probability, the second conditional probability, a selectivity of the first predicate on the table, a number of tuples of the sample satisfying the second predicate, a number of tuples of the sample not satisfying the second predicate, and a number of tuples of the sample satisfying the first predicate and not satisfying the second predicate; and
determining a selectivity of the query on the table based on the first adjusted conditional probability.

6. A method according to claim 5, wherein determining the selectivity of the query on the table comprises multiplying the first adjusted conditional probability and a probability of selecting a tuple of the sample satisfying the second predicate.

7. A method according to claim 5, wherein determining the first conditional probability comprises:
  determining that no tuples of the sample satisfy the first predicate and the second predicate; and
  in response to the determination that no tuples of the sample satisfy the first predicate and the second predicate, determining the first conditional probability as equal to $(\ln(2))/2$ m, where m is a number of tuples in the sample.

8. A method according to claim 7, wherein determining the selectivity of the query on the table comprises multiplying the first adjusted conditional probability and a probability of selecting a tuple of the sample satisfying the second predicate.

9. A database node comprising:
a data source comprising a plurality of data rows; and
a query processor to:
determine a query on the data source, the query including a first predicate and a second predicate;
determine a sample of the data source, the sample comprising a plurality of data rows of the data source;
determine a first conditional probability of selecting a data row of the sample satisfying the first predicate and the second predicate by:
  determination of a number of tuples of the sample which satisfy the first predicate and the second predicate; and
  determination of the first conditional probability based on the number of tuples of the sample which satisfy the first predicate and the second predicate divided by the number of tuples of the sample;
determine a second conditional probability of selecting a data row of the sample satisfying the first predicate and not satisfying the second predicate;
adjust the first conditional probability based on the first conditional probability, second conditional probability, a selectivity of the first predicate on the data source, a number of data rows of the sample satisfying the second predicate, a number of data rows of the sample not satisfying the second predicate, and a number of data rows of the sample satisfying the first predicate and not satisfying the second predicate; and
determine a selectivity of the query on the data source based on the first adjusted conditional probability.

10. A database node according to claim 9, wherein determination of the selectivity of the query on the data source comprises multiplying the first adjusted conditional probability and a probability of selecting a data row of the sample satisfying the second predicate.

11. A database node according to claim 9, wherein determination of the first conditional probability comprises:
    determination that no data rows of the sample satisfy the first predicate and the second predicate; and
    in response to the determination that no data rows of the sample satisfy the first predicate and the second predicate, determine the first conditional probability as equal to $(\ln(2))/2\,m$, where m is a number of data rows in the sample.

12. A database node according to claim 11, wherein determination of the selectivity of the query on the data source comprises multiplying the first adjusted conditional probability and a probability of selecting a data row of the sample satisfying the second predicate.

* * * * *